Dec. 27, 1949  H. A. FLOGAUS  2,492,416
COMBINED VEHICLE SPRING SUSPENSION AND STABILIZER
Filed Dec. 15, 1944  2 Sheets-Sheet 2
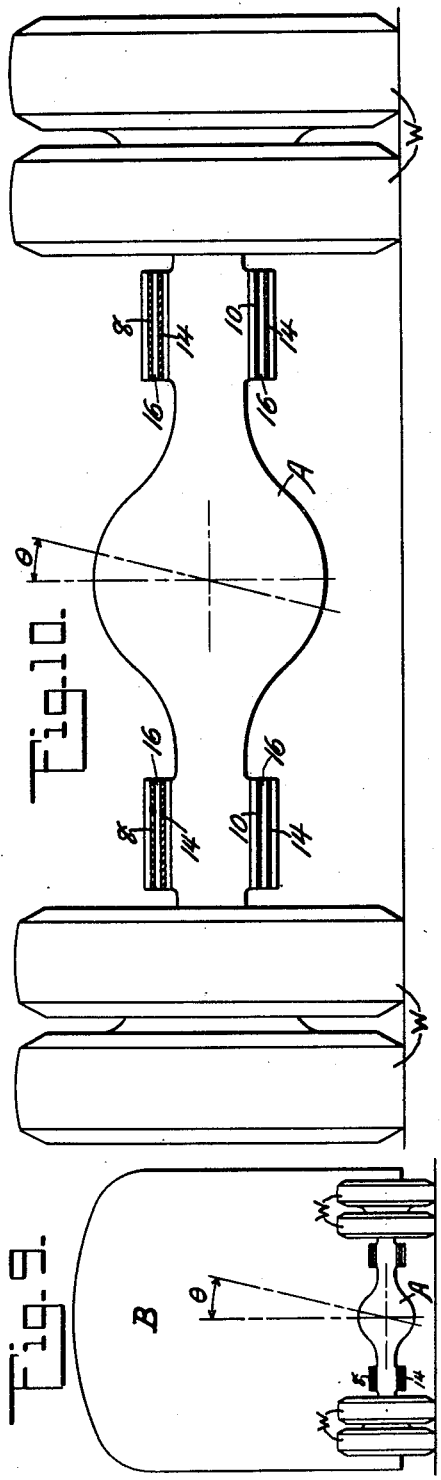
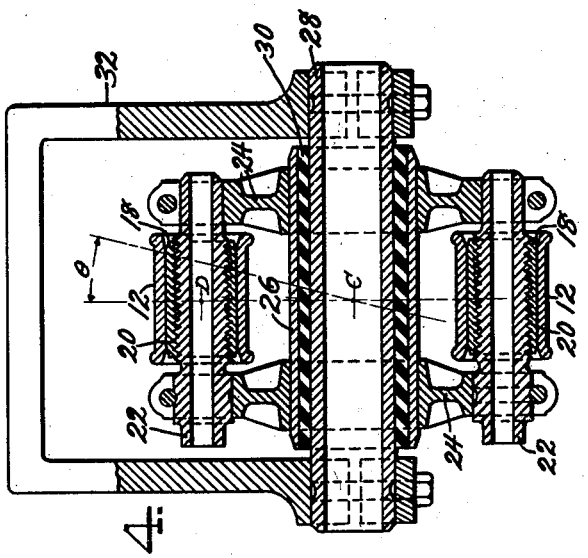
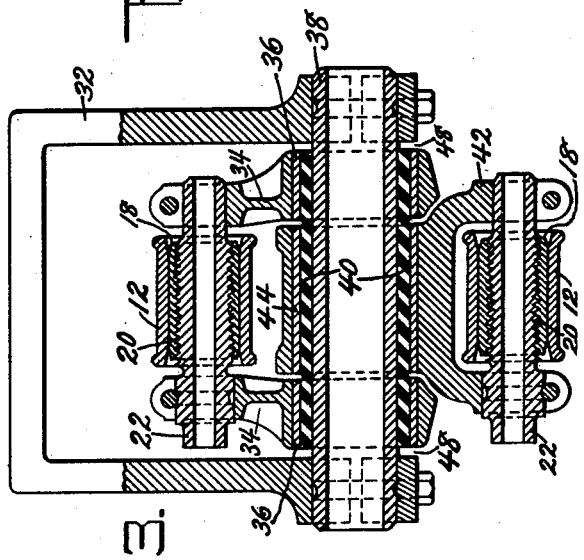
INVENTOR
Howard A. Flogaus
BY
Robert A. Shields
ATTORNEY Patented Dec. 27, 1949

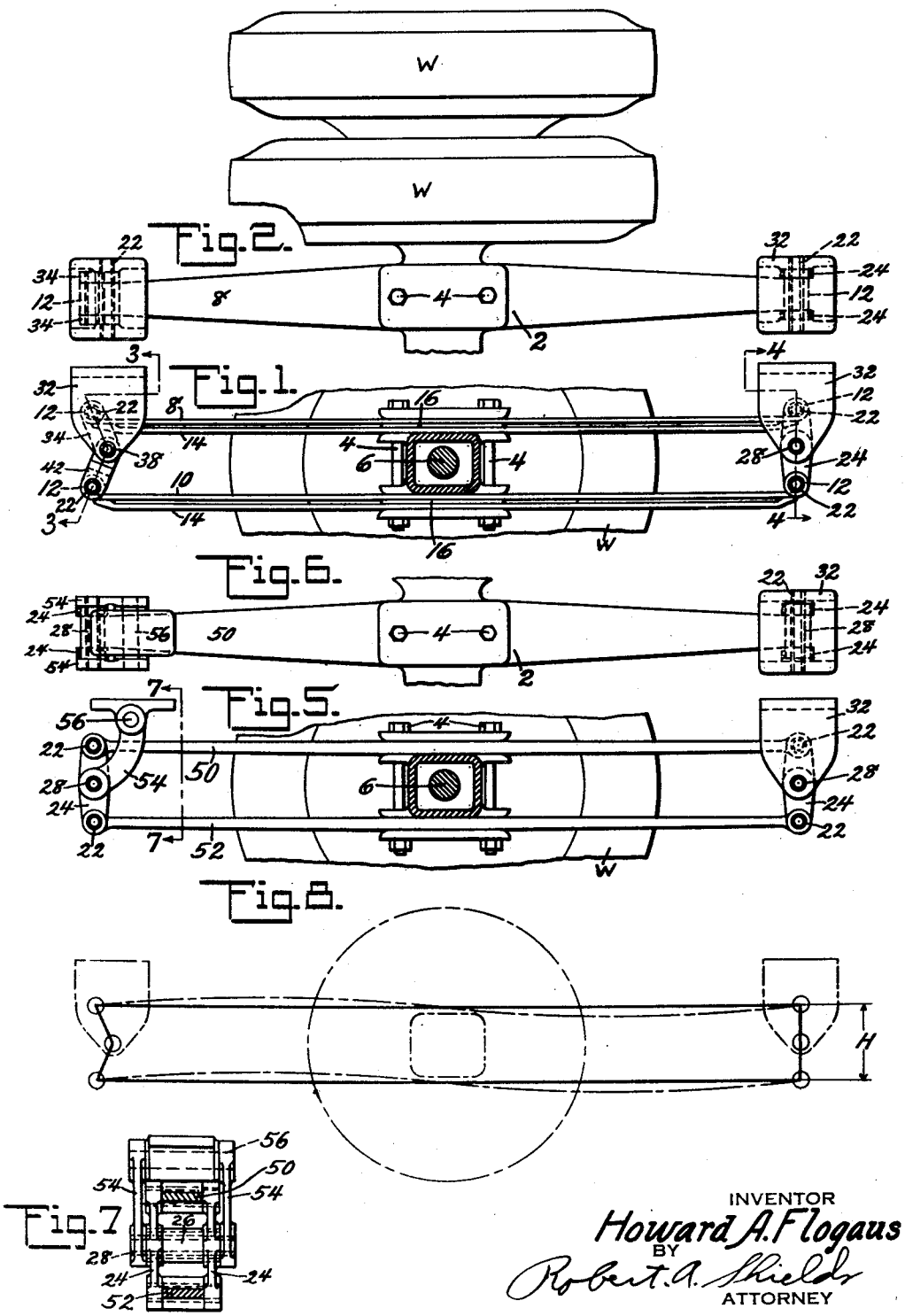

2,492,416

UNITED STATES PATENT OFFICE 2,492,416

COMBINED VEHICLE SPRING SUSPENSION AND STABILIZER

Howard A. Flogaus, Wallingford, Pa., assignor to A C F-Brill Motors Company, New York, N. Y., a corporation of Delaware Application December 15, 1944, Serial No. 568,281

1 Claim. (Cl. 267—38)

This invention relates to vehicle spring suspension in general and in particular to a combined spring suspension and stabilizer.

Road vehicles have in general been mounted on semi-elliptic springs of the multiple leaf type. Such springs can be designed to give fairly satisfactory results when the shocks to be absorbed are of low frequency. When, however, the shocks are of high frequency these multiple leaf springs do not operate properly and will transmit the shock direct to the vehicle. The present type of semi-elliptic spring has the load transmitted from leaf to leaf with each leaf end having imposed upon it substantially the vehicle load, and since movement occurs between the leaves considerable friction is present. It is well known that the static coefficient of friction is much higher than the kinetic coefficient of friction. Due to the heavy loading at the spring ends and varying coefficient of friction, depending upon whether the ends are moving relative to the adjacent leaf or not, it is obvious that this type of spring can not function properly to absorb varying shock frequencies. Slow and large movement causes the entire length of a multi-leaf semi-elliptic spring to act, but rapid and small movement will not overcome the leaf friction near the center so that this friction bound portion is inactive. In other words, instead of having a long soft spring supporting the vehicle there is in effect a short stiff spring supporting the vehicle when the shock vibrations become relatively high. That is to say, on cobble stone or corrugated roads at relatively high speed only the top one or two leaf spring ends work to absorb the vibration, with the result that most of the vibration is transmitted direct to the body.

It is also necessary in automotive work that the springs be capable of absorbing braking and sometimes braking and driving torques. With the semi-elliptic spring the top leaf, insofar as its load supporting function goes, need be only strong enough to transmit the load to the ends of the second leaf and accordingly the top leaf need not have any great amount of metal. However, it must also transmit the driving and braking forces, and in average road vehicles where the top leaf will have from 1/6 to 1/18 of the total strength of the spring, dependent on the number of leaves in the spring, this relatively weak leaf in absorbing the braking and driving forces may be highly over stressed with breakage likely to occur.

When relatively soft semi-elliptic springs are used or when coil springs are used, it is necessary that stabilizers be added to absorb some of the roll of the vehicle and assist the springs in preventing side sway or lateral movement of the vehicle relative to the axles. Such stabilizers are used to a large extent on small passenger vehicles but for trucks and buses they have proven impractical since it has been impossible to design a practical stabilizer of sufficient strength to absorb the tremendous forces present. It is, of course, obvious that these various stabilizers and sway controls add to the cost of the vehicle.

In recent years there has been some activity along the lines of making soft spring with all the leaves full length, for with this type of spring variable interleaf friction is eliminated and the leaves are held in spaced relation with very low end friction since the end load will be absorbed by each leaf at the same distance from the axle. The low end friction cannot make part of the spring length inactive since it is located beyond that portion of the spring which flexes. With long springs where one or two leaves are used, it is, of course, necessary that a much greater thickness of metal be used in order to carry the load, since in this case the beam length extends from the shackle to the axle, not from the shackle to the next adjacent spring end as in the multi-leaf semi-elliptic type of spring. This greater mass of metal will accordingly result in much lower stresses in resisting braking and driving forces.

It has been discovered that when the full length springs are properly shaped and connected to the vehicle they will serve to not only support the vehicle and absorb substantially all rates of vibratory shock, but will also function to prevent roll and side sway of the vehicle. It is an object, therefore, of the present invention to provide a vehicle spring suspension of such a type that the necessity for stabilizers is eliminated and the spring will take over the function of stabilizing the vehicle.

A further object of the invention is the provision of a vehicle spring suspension so designed as to have extreme rigidity to resist torsional strains imposed by relative roll between the body and axle.

A still further object of the invention is the provision of a soft spring suspension having substantially no interleaf friction and capable of absorbing varying rates of vibratory shocks while of itself maintaining the vehicle in a stable condition.

Yet another object of the invention is the provision of a combined vehicle spring suspension and stabilizer in which substantially all forces acting on the spring are resiliently absorbed either by the spring itself or by the connecting shackles, or both.

Still another object of the invention is the provision of a combined vehicle spring suspension and stabilizer having the springs and vehicle support points and axle so related that the springs are substantially horizontal under normal loading and are so connected as to remain substantially parallel at all times.

These and other objects of the invention will be apparent to persons skilled in the art from a study of the following description and accompanying drawings, in which Fig. 1 is an elevational view showing one form of the spring suspension;

Fig. 2 is a plan view of the spring suspension showing the leaf contour;

Fig. 3 is an enlarged sectional view through the swinging shackles and taken substantially on line 3—3 of Fig. 1;

Fig. 4 is an enlarged sectional view taken substantially on line 4—4 of Fig. 1 and showing the rigid rotatable shackles;

Fig. 5 is an elevational view similar to Fig. 1 but showing a slight modification thereof;

Fig. 6 is a plan view of the modification of Fig. 5;

Fig. 7 is a sectional view taken substantially on line 7—7 of Fig. 5;

Fig. 8 is a diagrammatic view showing the flexure of the springs of Fig. 1;

Fig. 9 is an end view of a vehicle having the improved suspension mounted thereon, and Fig. 10 is an end view of the drive axle with the improved spring suspension.

Referring now to the drawings in detail, it will be seen that the vehicle body B is mounted on the axle housing A by means of the improved spring suspension and that the axle housing is in turn supported on the roadbed by wheels W. As clearly shown in Figs. 1 to 4 and 8 to 10 inclusive, the spring suspension is accomplished by means of two plate springs above and two plate springs below the axle. These plate springs are tapered in width so that the central portion 2 is much greater in width than the end portions. The wide central portion of each of the springs is pierced to receive bolts or other fastening devices 4 by means of which the leaves may be rigidly clamped to the axle housing at substantially equal distances from the axle center 6. As clearly shown, the top leaf 8 of the upper group and the top leaf 10 of the lower group have their ends formed to provide eyes 12 by means of which the springs may be fastened to the vehicle and loaded. The bottom leaves 14 of the upper and lower groups are full length and have their ends bearing on the upper leaf only at the eye portion and held out of contact at the center portion by means of spacer plates 16 (Figs. 1 and 10), thus the leaves are out of contact throughout their length excepting only the ends. Each of the spring eyes 12 has pressed therein a bushing 18 threaded internally as at 20 and adapted to rotate on the threads of a spindle 22. The spindles at the forward ends of the springs are clamped in the extremities of rigid shackle members 24 (Fig. 4). These rigid shackle members are non-rotatably fixed on a tube 26 which is supported in spaced relation to a main spindle 28 by a tube of resilient material 30. This resilient material may be rubber or some similar material preferably vulcanized or otherwise fastened to the interior of tube 26 and to the exterior of main spindle 28. The ends of the main spindle 28 are clamped in the ends of bracket 32 rigidly carried by the vehicle body.

The opposite or rear ends of the springs also have bushings pressed therein and rotating on similar spindles 22 and accordingly the same reference characters have been used. In this case, however (Fig. 3), the upper spindle 22 has its ends clamped in upwardly and rearwardly inclined swinging shackles 34 which are non-rotatably fixed on short tubes 36 held in spaced relation to a main load transmitting spindle 38 by means of a resilient tube 40. The lower spindle 22 is clamped in a rearwardly and downwardly inclined swinging shackle 42 which in turn is non-rotatably mounted on a tube 44, likewise supported in spaced relation to spindle 38 by the resilient material 40 previously referred to. The spindle 38 is clamped in a body carried bracket 32 and will transmit load from the vehicle to the resilient material and thence to the springs. It is obvious that the resilient material 40 may be formed as a single tube as shown or may be formed in three parts, in which case shackles 34 and 42 would be mounted on independent resilient tubes. In any case, however, the resilient material is preferably fastened to the spindle 38 and to the tubes 36 and 44.

It is to be noted that the rigid rotating shackles 24 and the swinging shackles 34 and 42 have all of their rotating or swinging movements resisted by the resilient material acting in shear. Also any lateral movement between the shackles and the body carried brackets will be resisted by the material acting transversely in shear. Slight clearances 48 are provided in each case between the shackles and the brackets so as to permit a small amount of lateral motion. Also all vertical loads and torsional strains will be resiliently absorbed by the material acting in compression.

It will be seen that the axle 6 and load transmitting spindles 28 and 38 are centrally located between the upper and lower spring leaves and the springs are designed so that the vehicle body with its normal load will cause the springs to assume a substantially horizontal position as shown in Figs. 1 and 5. Attention is directed to the fact that the shackles and axle clamps will hold the springs in substantially parallel relationship as viewed from the side and also that the special shackles and mounting will hold the springs in parallel relationship as viewed from the end.

In the form shown in Figs. 5 and 6 the upper spring leaf 50 and lower spring leaf 52 are clamped to the axle housing in the same manner and have substantially the same form as the springs previously described and accordingly the same reference characters have been used wherever possible. Likewise, the shackling arrangement at the forward end of the spring is identical to that just described and the same reference characters have accordingly been applied. At the rear end of the springs the rigid shackles 24 have been used and the spindle 28 is rotatably carried in the curved ends of links 54, the upper ends of which are rotatably carried on spindles 56 fastened to the vehicle body. The swinging links 54 are, like the rigid brackets previously described, made of sufficient strength to transmit to the spring ends all torsional strains caused by roll of the body.

It will be obvious that under straight vertical loading the springs will be held in their predetermined spaced relationship by the clamping means at the center and by the shackles at the ends and that during flexing of the springs under vertical loading the parts will remain in their parallelogram relationship, with the result that but slight rotation will be necessary at the shackles. This slight rotation will be resisted by the resilient material 30 and 40 acting in shear. When the brakes are applied the resulting torque will tend to rotate the axle housing in a clockwise direction as viewed in Fig. 8. Such rotation of the axle will cause the springs to assume a position corresponding to that shown in line and dash with the result that the shackles will rotate, with the rotation resisted by the resilient material 30 and 40 acting in shear. Such rotation of the shackles will prevent excessive strains being imposed on the springs, which excessive strains are present in case the ends of the springs are anchored to the vehicle. Driving reactions will cause a similar spring and shackle movement but in this case the springs would assume a curved position on the opposite side of the spring from that shown in Fig. 8.

Since the springs are normally substantially horizontal with axle 6 and load points 28 and 38 substantially in alignment, lateral thrusts will be resisted by the springs in cantilever fashion. In other words, the springs will function as cantilever beams having a thickness equal to the thickness of the springs and a depth equal to the width of the springs. Due to the large amount of metal in the spring required by the necessity for supporting the vehicle, it will be seen that these springs are extremey rigid in a lateral direction and this rigidity is materially increased by having the springs of greater width adjacent the center than at the ends. It is always desirable in vehicle work not to have too rigid a construction, accordingly a certain amount of lateral motion is permitted by providing the clearance 48. The lateral movement between the body and springs is resiliently resisted by the material 30 and 40 acting in shear. No lateral movement is permitted between the springs and the shackles supporting them.

Since no movement is permitted between the spring ends and their shackles, it will be obvious that the shackles and springs as viewed from the end must remain in fixed parallel relationship. The same is true with respect to the springs and the axle housing to which they are rigidly clamped. In other words, as viewed from the end the springs are like a square tube with the leaves forming the top and bottom and with the sides entirely removed. The shackles and axle housing replace the function of the sides of the box in that they hold the top and bottom sides or leaves in parallel and predetermined spaced relationship. As shown on the drawings the spring leaves are spaced apart a distance H (Fig. 8) which is equal to the depth of the axle housing. It will be obvious, however, that by use of a special housing or by use of shims the spacing may be decreased or increased as desired within the limits imposed by road and body clearances. An increase in the spacing H will increase the stiffness of the spring assembly in resisting torsional strains without in any way affecting either the vertical springing or the ability of the springs to resist lateral forces.

Referring now particularly to Figs. 9 and 10, it will be seen that as a vehicle body goes around a curve the center of gravity, being of necessity above the axle line, will cause the body to lean or roll through an angle $\theta$. Various other things may cause this same angular movement between the body and axle, such as for instance the wheels on one side of the road striking a relatively high bump or by a sudden shifting of the load in the vehicle or a tire blowout. Whatever the cause, the relative rotation between the body and axle will impose a torsional strain on the spring assemblies but these assemblies are extremely rigid due to their being locked or held in a form roughly equivalent to a box section tube.

The distance moved by a particle rotating about a center is equal to the angular movement expressed in radians multiplied by the distance from the particle to the center of rotation. Thus it will be seen that a torque or twist caused by roll of the vehicle will result in a rotation of main spindles 28 and 38 about their center. Rotation of these main spindles in a plane extending transversely of the vehicle will cause the shackles, spindles 22 and spring ends to also rotate around the center C (Fig. 4). Rotation of the spring ends about the center C will, of course, tend to cause a rotation of the springs about a center D. However, since the spacing between C and D, namely H/2, is so much greater than half the width of the spring leaves at the eyes, the angular movement or twist of the leaves is relatively small. Their lateral movement, however, is relatively great due to the comparatively great spacing between centers C and D. As a result the leaves may be considered as resisting the torque caused by body roll by acting as cantilever beams loaded in opposite directions by a force equal to half the torque. These cantilever beams will have a depth equal to the width of the springs and a thickness equal to the depth of the springs. It will thus be seen that although the springs may partially resist torsion by a twisting of the spring leaves, their main resistance is derived by acting as cantilever beams. The torsional rigidity of the spring assembly will, of course, be increased by increasing H which, of course, increases the distance between C and D thereby tending to cause greater lateral movement of the spring ends without increasing the twist of the leaf itself, provided, of course, the leaf width at the eye is not increased.

In the present instance the distance H is roughly two and a half times the width of the springs at the eyes and this produces a spring assembly extremely rigid in torsion. Here again, since it is desirable to have a certain amount of flexibility, the resilient material 30 and 40 will act in compression to absorb some of the torsional shock before transmitting it to the springs or body. It is, of course, desirable that the main spindles 28, 38 and axle 6 remain as nearly in alignment as possible but comparatively large deviations from this alignment under load conditions do not greatly affect the torsional rigidity of the assembly.

From the preceding it will be seen that the vehicle is mounted on its axles by long soft springs having the leaves of comparatively heavy cross-section necessary to support the load. It will also be seen that where multiple leaves are used these leaves are spaced apart and there is low and constant interleaf friction. It will also be seen that due to the relatively great thickness of the leaves and their tapered width they have been given great stiffness to resist lateral thrusts. In other words, the wheels cannot readily move laterally with respect to the vehicle. It will also be seen that due to the special arrangement and connection of parts the spring assembly has been given great torsional rigidity and that roll of the vehicle will be substantially prevented. Decrease of roll will, of course, increase the comfort of ride and at the same time greatly increase the safety due to the fact that with roll substantially prevented curve speeds may be greatly increased without danger of overturning. It will also be seen that although great torsional rigidity and lateral stability have been built into the spring, a certain degree of resiliency has been added by the use of the resilient material 30 and 40 at the main supporting spindles. This resilient material will act in shear to resist angular movement of the shackles during normal spring movement and will also act in shear to resist lateral movement between the body and spring. The resilient material will also act in compression to resiliently resist torsional strains between the body and axle.

While the invention has been described more or less in detail and with reference to specific embodiments thereof, it will be obvious to persons skilled in the art that various other embodiments may be made without departing from the scope of the appended claim.

What is claimed is:

In a motor vehicle having a frame and an axle, a suspension comprising longitudinal spring members having spaced leaves of substantially equal length, such members being fixedly secured to the upper and lower sides of the axle, a shackle pivotally connected between the forward ends of associated spring members by means including spindles threaded through the spring members, a shackle pivotally connected to the rear end of each spring member by means including a spindle threaded through the spring member, a supporting spindle mounted centrally in the forward shackle for rotation transverse thereto, a second supporting spindle coupling associated rear shackles for rotation about a point substantially midway between the spring members, resilient sleeves interposed between the supporting spindles and their associated shackles, such sleeves being bonded to these members so as to provide for restricted movement therebetween and brackets dependent from the under portion of the frame fixedly securing the supporting spindles.

HOWARD A. FLOGAUS.

REFERENCES CITED

The following references are of record in the file of this patent:

UNITED STATES PATENTS

| Number | Name | Date |
|---|---|---|
| 1,130,157 | Elling | Mar. 2, 1915 |
| 1,322,440 | Hill | Nov. 18, 1919 |
| 1,654,447 | Ballot | Dec. 27, 1927 |
| 1,788,061 | Kutsukian | Jan. 6, 1931 |
| 1,808,473 | Neisler | June 2, 1931 |
| 1,867,647 | Brock | July 19, 1932 |
| 1,982,456 | Scarratt et al. | Nov. 27, 1934 |
| 1,985,709 | Zerk | Dec. 25, 1934 |
| 1,991,254 | Lord | Feb. 12, 1935 |
| 2,155,073 | Ziska | Apr. 18, 1939 |
| 2,211,647 | Collier | Aug. 13, 1940 |
| 2,469,925 | Latshaw | May 10, 1949 |

FOREIGN PATENTS

| Number | Country | Date |
|---|---|---|
| 227,397 | Great Britain | Jan. 15, 1925 |